Aug. 8, 1944.   D. P. BERNHEIM   2,355,048
OPHTHALMIC MOUNTING
Filed Aug. 2, 1941   2 Sheets-Sheet 2
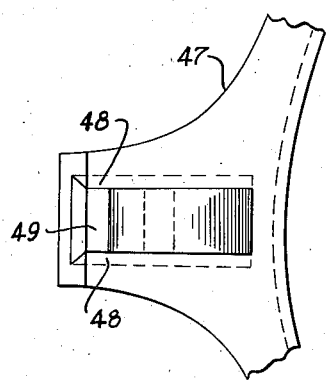
Fig. 7
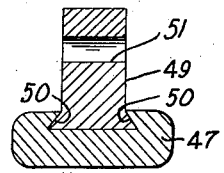
Fig. 9
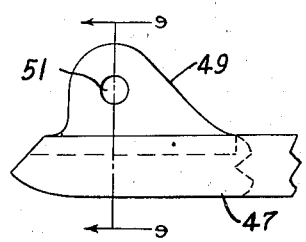
Fig. 8
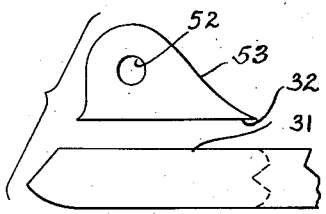
Fig. 10
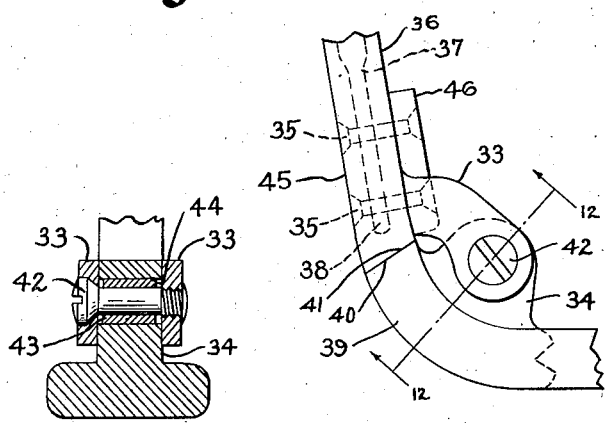
Fig. 12
Fig. 11
DANIEL P. BERNHEIM
INVENTOR
BY
ATTORNEY Patented Aug. 8, 1944

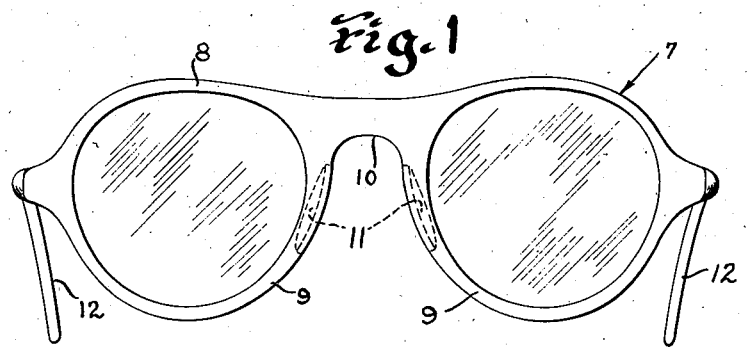
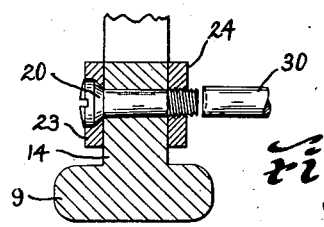
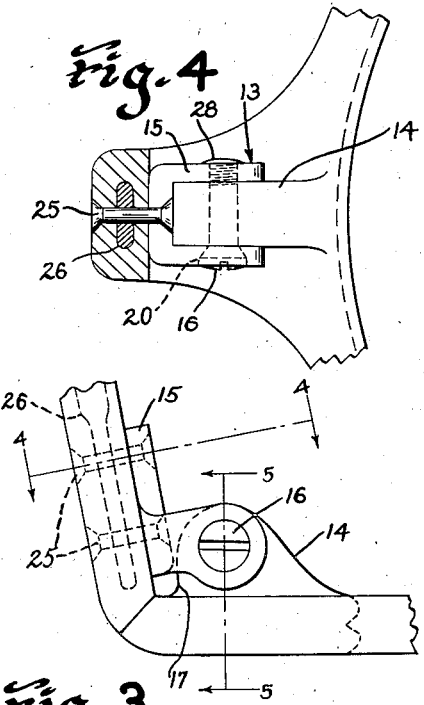
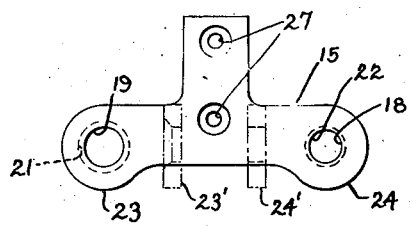

2,355,048

UNITED STATES PATENT OFFICE 2,355,048

OPHTHALMIC MOUNTING

Daniel P. Bernheim, Southbridge, Mass., assignor to American Optical Company, Southbridge, Mass., a voluntary association of Massachusetts Application August 2, 1941, Serial No. 405,224

6 Claims. (Cl. 88—53)

This invention pertains to improvements in ophthalmic mountings and more particularly to novel means and arrangements of parts.

It is a primary object of the invention to provide a novel ophthalmic mounting utilizing dissimilar materials in the temple connecting hinge so that a suitable frictional hinge may be obtained while reducing the wear on the hinge surfaces, thereby providing a hinge having longer life due to reduction of wear on the interengaging hinge interfaces.

A further object is to provide a novel means to pivotally connect a temple to the front of an ophthalmic mounting by having one portion of the hinge made of metal and the other portion of the hinge having frictional surfaces of a self-lubricating plastic material.

A further object of the invention is to provide a construction of the above presented character wherein the temple lug is made of a non-metallic substance such as a resinous material or any other suitable moldable plastic used in conjunction with a temple having a metallic hinge secured thereto, which hinge engages the lug and is pivotally connected thereto.

A further object is to provide an ophthalmic mounting with a front of a moldable plastic material having a lug formed of the same moldable material which lug is located in the rear of the mounting and is so shaped as to provide increased rigidity for the lug which is pivotally connected to a metal hinge secured to the temple.

A further object is to provide a plastic front for an ophthalmic mounting with a lug molded on either side at the rear of said mounting with the lug pivotally connected to a temple, while each of said temples terminates in contiguous relation with the front when said temples are extended as when in use by an individual.

A further object of the invention is to provide the construction of the above presented character wherein the temple pivotal pin is capped over as by a spinning action.

A further object of the invention is to provide longevity in a temple hinge connection by using a plastic lug which engages a metallic hinge portion, which hinge is provided with a screw that is permanently locked to positively hold the opposing portions of the pin in fixed frictional relation thereby reducing what is commonly referred as to "drop temples."

Other objects and advantages of the invention will become apparent from the following description taken in connection with the accompanying drawings and it will be apparent that many changes may be made in the details of construction and arrangement of parts given without departing from the spirit of the invention as expressed in the accompanying claims. Therefore, it is not intended that the invention be limited to the exact details of construction and arrangement of parts shown and described as the preferred forms only have been given by way of illustration.

Heretofore, ophthalmic mountings of the type presented herein introduced difficulty in manufacturing, particularly in the assembling of the temple connections of such mountings so that the temple would be properly aligned and would operate suitably when secured ultimately to the mounting. The hinge connection was usually made of a metallic hinge having one portion secured to the temple and the other portion secured to the front. In order to obtain a suitable hinge for the mounting, machining of the various hinge parts and friction surfaces was necessary to provide a good friction hinge that would add longevity in carrying out the purpose for which the hinge was intended.

In making the hinge out of similar metals the friction between the surfaces of the engaging hinge portions would ultimately cause the surfaces to wear thus requiring a further adjustment of the temple pivotal connection. This adjustment was necessary not only because of wear due to friction of the engaging hinge surfaces, but frequently was necessitated by loosening of the screw which connected the temple to the temple lug.

The present invention in using dissimilar materials, with one of said materials being a homogeneous plastic, and the other being a metal, provides an unusual action between the surfaces which tends to give longevity to the desired working qualities of the hinge before an adjustment of the temple screw is required.

By using the dissimilar materials such as a resinous lug with interengaging metal portions, the undesirable condition of what is commonly known as "drop temples" is greatly reduced, and with the temple screw having a spun end thereon as a locking means, actual fatigue tests have shown the hinge to have a long life value before the temple is appreciably loosened.

In the drawings:

Fig. 1 is a front elevation of the ophthalmic mounting embodying the invention.

Fig. 2 is a top plan view of the ophthalmic mounting shown in Fig. 1.

Fig. 3 is an enlarged fragmentary plan view showing the temple hinge connection in assembled position.

Fig. 4 is an enlarged sectional view taken along lines 4—4 of Fig. 3.

Fig. 5 is an enlarged sectional view taken along lines 5—5 of Fig. 3, with a spinning tool in position to lock the screw on the hinge.

Fig. 6 shows the connecting hinge in its blanked out shape prior to being bent to the suitable shape for frictionally engaging the lug.

Fig. 7 is a partial rear view of the ophthalmic mounting with the temple removed to show a modification of the lug to which this temple is secured.

Fig. 8 is a side view of Fig. 7.

Fig. 9 is a sectional view taken along lines 9—9 of Fig. 8 showing the dovetailing of the lug with the mounting.

Fig. 10 is a partial side view of a modification wherein the lug is in position to be cemented on its mounting support portion.

Fig. 11 is a modification of the temple connection.

Fig. 12 is a sectional view taken along lines 12—12 of Fig. 11.

Referring to the drawings and more particularly to Figs. 1 and 2, an ophthalmic mounting 7 comprises a front 8 of homogeneous material having lens rims 9 connected by a bridge portion 10 with nose pieces 11 for engaging the nose of an individual. Temples 12 are shown in fully extended position in Fig. 1, and are shown broken away in Fig. 2. The temples are pivotally connected to the front by a hinge 13, said hinge for each temple comprising a lug 14 which is molded on the rear of the front, and a bifurcated metallic member 15 which is connected to the temple. The lug 14 on the rear of the front is molded of the same material of which the entire front is made. The front is made of preferably a moldable plastic material such as a resin or other thermoplastic material containing a liquid plasticizer.

The hinge 13 is pivotally connected by a screw or pin member 16 which is inserted through aligned holes in the bifurcated metallic member 15 connected to the temple and the lug 14 which is part of the front.

The enlarged views of the hinge, as shown in Figs. 3 and 4, more clearly show the relation of parts wherein the lug 14 is shown extending from a location substantially contiguous with the lens supporting area, and is inclined away from the lens area in such a manner as to permit the base of the lug to be appreciably stronger than would be the case if the lug were to extend away from the rear of the front with the side wall angles substantially ninety degrees from the base. The edge 17 of the lug 14 may extend downwardly as shown in Fig. 3 or may be inclined away from the opposite edge, and extend inwardly toward the rear base of the front so that it may terminate toward the outer extremity of the front on the rear base portion.

The temple lug which is moldably connected to the rear of the base front is appreciably wider at the base of the lug than it is at any other point along a line extending substantially at right angles from the front. This extremely wide base gives added strength to the temple lug so that a great amount of strain may be exerted thereon without breaking the lug.

The bifurcated metallic member 15 is shown as a blank in Fig. 6. The openings 18 and 19 are properly aligned so that the screw 16 may extend therethrough with the head of the screw 20 being seated approximately in the area shown by the dotted line 21 while the threaded portion of the screw will engage the threads in the area shown by the dotted line 22 on the opposite ear of the bifurcated metallic hinge portion 15. The ears 23 and 24 are shown in full lines after the blanking operation while the dash-pot lines 23' and 24' show the position of the ears after they are bent inwardly so that they will have substantially parallel sides, the inner distance therebetween being substantially equivalent to the thickness of the lug.

To obtain greater friction of the bifurcated member on the temple lug, the ears 23 and 24 may be bent so that the inner surfaces are slightly inclined to more firmly grip the lug. The bifurcated member 15 is secured to the inner end of the temple 12 by means of pins or screws 25 which extend through a metallic support 26 which is embedded within the plastic outer shell of the temple. Holes are provided through the temple and the flattened portion of the temple wire support 26, which holes are lined with holes 27 in the bifurcated member 15. The pins 25 are shown flattened on the opposing ends to retain them in fixed position with the temple and the bifurcated member 15.

The temple connecting screw 16 shown in Fig. 4 has the threaded end thereof flared outwardly to provide an enlarged portion which prevents the screw from becoming loosened. The free end of the screw is spun resulting in a head 28.

The cross sectional view shown in Fig. 5 shows the lug support portion 9 with the lug 14 extending therefrom. The ears 23 and 24 engage the side walls of the lug while the screw 16 extends through the aligned holes with the free end thereof adjacent a portion of a spinning tool 30. The spinning tool is revolved at a sufficient rate of speed so that when it engages the threaded end of the screw a head 28 (Fig. 4) will result.

The modification shown in Figs. 7, 8, and 9 employs a portion of a plastic lens rim 47 which has an enlarged portion forming a protuberance having a cut out portion with inclined sides 48 with a temple lug 49 having inclined sides 50 on the base portion thereof which suitably engage the inclined sides 48 formed in the rear of the ophthalmic mounting.

An opening 51 provides a passage for the temple screw or temple pin which pivotally connects the temple to the temple lug. The temple connection holes in the various lugs may be formed at the time of injection or subsequently machined or pierced. The dovetailing together of the lug with its mounting is preferably the result of machining the interfaces of the dovetailed portion, and thereafter cementing the lug base into the complemental base receiving portion. Molding of the parts may be done but the present invention preferably concerns machine parts having a desirable mechanical fit.

The front 7 and integral lugs 14 of the above described construction are preferably formed by injection molding.

If it is desired to form the plastic lens rims 47 or entire front of the mounting separately of the temple lugs 49, as shown in Figs. 7, 8, and 9, the said front may be formed by injection molding or may be blanked from sheet material and thereafter fabricated to the contour shape and size desired. In this particular instance the material of the front may be cellulose acetate, methyl methacrylate, cellulose acetobutyrate, cellulose acetopropionate or other similar materials containing suitable liquid plasticizers and which are suitable for injection molding or may be formed of cellulose nitrate or other similar materials which are not suitable for injection molding but which may be blanked from sheet material and thereafter fabricated to the size and shape desired. In either of the above instances, the lugs 49 may be formed separate and attached to the front as shown in reference to Figs. 7, 8, 9, and 10.

In order to provide the self-lubricating, wear-resisting characteristics desired, the lugs 49 are preferably formed of cellulose acetate or other suitable material containing liquid plasticizers. The front, therefore, may be formed of material having the characteristics of cellulose nitrate and the lugs 49 formed of material having the characteristics of cellulose acetate. It is particularly pointed out that the temple connection lugs are preferably formed of material having the characteristics of cellulose acetate containing a liquid plasticizer which provides a self-lubricating action when in use as a temple hinge.

The modification shown in Fig. 10 includes a lug 53 having an aperture 52 therein for receiving the temple connecting screw, while the thickness of the lug is substantially uniform throughout and the lug may be slightly flared at the bottom if desired to increase the width of the base for purposes of strengthening the base supporting portion. The top of the protuberance 31 is flat so that the flat portion 32 or base of the lug and the protuberance will have substantially parallel engaging surfaces. With the disclosure shown in Fig. 10, the lug is cemented to the protuberance portion 31.

The modification shown in Figs. 11 and 12 comprises a temple 45 which has a metallic plate portion 46 with turned up portions 33 which are bent inwardly toward the plastic lug 34 with the portions 33 on either side of the plate 46 forming a bifurcated temple lug engaging portion, the inner surfaces of said portions 33 engaging the side portions of the plastic lug 34. The temple is formed of an inner wire 37 having a plastic coating 36 on the outside thereof and is much the same as the temple shown in Fig. 3. The flattened portion 38 of the reinforcing metallic temple wire 37 has apertures therein, which align with apertures in the plate 46 and the plastic covering 36 of the temple. Pins 35 are inserted in their respective openings and are headed to securely hold the plate 46 in fixed relation to the temple.

The temple lug 34 is formed on an elbow portion 39 which is in fact a bent protuberance of the lens rim so that the lug 34 is on the rear surface of the ophthalmic mounting front. The end 40 of the bent protuberance acts as a stop surface for the end 41 of the temple. The screw 42 interconnects the metallic hinge portions 33 with the stud portion 34 forming a pivotal connection between the temple and the ophthalmic mounting front, the screw 42 being securely held in position by any suitable means. The cross sectional view shown in Fig. 12 presents a modification of securing the metallic portions 33 to the stud 34 wherein a metallic collar 43 is forcibly fitted into the aperture 44 in the stud 34. It will be noted that the axial length of the collar 43 is shorter than the axial length of the aperture 44, so that the metal collar may be centrally disposed in the aperture 44 and will not extend to the surface of the stud 34 thus preventing the metallic portions 33 from engaging the metallic collar 43. The screw 42 has a metallic pivotal bearing with the collar 43 while the metal inner surfaces of the parts 33 engage only the plastic surfaces of the lug 34.

A means of securing the plastic lug to the mounting as shown in Fig. 12 may be any means disclosed herein since the purpose of the Fig. 12 disclosure is primarily directed to connecting the temple to the lug.

Ethyl acetate or other suitable solvent is used as the cementing means serving to soften, superficially, the components so that where they are in close contact evaporation of the solvent causes them to unite.

The mechanical uniting of the stud with the body of the lens supporting member may be done by mechanically fitting the stud into a recess and cementing the stud to the surface of the lens supporting member or by riveting with metallic or non-metallic rivets or pins. This method of construction may be preferable as it permits the non-metallic parts to be injection molded and different constructions are possible with a limited number of molds.

It is particularly pointed out that regardless of what material is used for the front, all the temple lugs of the above construction are preferably formed of cellulose acetate having liquid plasticizers.

The improved functioning of the resulting article has been determined by numerous tests which indicate the greater life, easier action and less attack by corrosive interferences than the customary construction which makes use of a metal pin or screw in a metallic hinge. While the exact modus operandi is not completely understood, it is believed that it is the result of the exudation of plasticizer from the portions of the plastic material immediately adjacent the metallic pin and hinge portion. At points where the pressure is high because of unavoidable manufacturing irregularities, the exudation is greatest and the elimination of friction most effective. At the same time, any excess exudate will be absorbed again by the plastic material whereby an excess or accumulation is prevented. It is not usually realized that at concentrated points of friction such as exist in small bearings of the type described as well as in large bearings, the local temperatures attained may be considerable due to the energy transformed under the influence of friction, the mechanical work being changed into heat. Such conditions arise during the opening and closing of the article under ordinary conditions of use. This effect is noted particularly in metallic bearings where the local temperatures may be great enough to fuse together superficially the adjacent parts of the metallic components unless a lubricant is provided. If such a lubricant is provided it is almost impossible to avoid an excess of lubricant which collects dust and abrasive material increasing the wear, or producing a discoloration which is objectionable or producing a corrosion of the metal parts. In the construction shown, there is no possibility of the excess of lubricant occurring inasmuch as the lubricant is automatically supplied when the need exists and removed from the scene of action when the need of its disappears, thus no excess of the lubricant material remains and no other lubricant need be supplied other than that furnished by the materials used.

While a specific disclosure has been presented herein, it is to be understood that other means of securing the temple hinge screw may be employed such as by swedging the free end of the screw with a special tool, or by using a nut, or by using a pin member substantially similar to the pin which secures the bifurcated member to the temple.

While the invention presented herewith shows the temple lug being connected to the rear of the front, using a bifurcated metallic portion engaging the plastic lug, it is pointed out that the plastic portion or lug may in fact be bifurcated forming two or more prongs of plastic with complemental metal portions. Any number of metallic or plastic prongs may be provided to interengage each other so long as at least one set is metal and the other set is of a desirable plastic.

It is also pointed out that the exact configuration of the temple lug may be modified somewhat to meet slight changes in the manufacture of the bifurcated hinge portion 15 or to satisfy other commercial requirements without departing from the spirit of the subjoined claims.

Having described my invention, I claim:

1. An ophthalmic mounting comprising a front composed of a pair of lens rims connected by a bridge member and having perforated temple supporting lugs with upper and lower substantially parallel bearing surfaces on the temporal sides of the rims, said temple supporting lugs being formed of a moldable plastic material containing a liquid plasticizer, in combination with temples having spaced perforated metallic hinge members engaging the upper and lower bearing surfaces of the lugs and pivot means extending through the openings in the hinge members and the opening in the temple lugs for pivotally retaining said metallic hinge members in frictional engagement with the respective upper and lower surfaces of the temple lugs, the characteristics of the plastic material containing a liquid plasticizer being such as to provide a self-lubricating action throughout the frictionally engaged surfaces of the assembled parts.

2. An ophthalmic mounting comprising a front composed of a pair of lens rims connected by a bridge member and having perforated temple supporting lugs with upper and lower substantially parallel bearing surfaces on the temporal sides of the rims, said temple supporting lugs being formed of cellulose acetate containing a liquid plasticizer, in combination with temples having spaced perforated metallic hinge members engaging the upper and lower bearing surfaces of the lugs and pivot means extending through the openings in the hinge members and the opening in the temple lugs for pivotally retaining said metallic hinge members in frictional engagement with the respective upper and lower surfaces of the temple lugs, the characteristics of the plastic material containing a liquid plasticizer being such as to provide a self-lubricating action throughout the frictionally engaged surfaces of the assembled parts, the said pivot means having an enlarged head adjacent one end thereof and having its opposed end flared to provide a head adjacent said end.

3. An ophthalmic mounting comprising a unitary front of non-metallic material embodying a pair of lens rims and an integral bridge member and integral perforated temple supporting lugs adjacent the temporal sides thereof, each of said lugs having upper and lower bearing surfaces in substantially parallel relation with each other, temple members having metallic hinge members comprising spaced perforated ears having bearing surfaces adapted to engage the respective upper and lower bearing surfaces of the temple lugs and means extending through the openings in said ears and the temple lugs for pivotally securing the ears in frictional engagement with the upper and lower bearing surfaces of the lugs, the said lugs being formed of a moldable plastic material containing a liquid plasticizer producing a self-lubricating action between the bearing surfaces of the assembled parts.

4. An ophthalmic mounting comprising a unitary front of non-metallic material embodying a pair of lens rims and an integral bridge member and integral perforated temple supporting lugs adjacent the temporal sides thereof, each of said lugs having upper and lower bearing surfaces in substantially parallel relation with each other, temple members having metallic hinge members comprising spaced perforated ears having bearing surfaces adapted to engage the respective upper and lower bearing surfaces of the temple lugs, one of the openings in said ears having a threaded bore, a pivot screw extending through the openings in the hinge ears and the respective temple lugs and threadedly connected with the threaded bore of one of said ears for retaining the ears in frictional engagement with the upper and lower bearing surfaces of the lugs, said lugs being formed of cellulose acetate containing a liquid plasticizer producing a self-lubricating action throughout said frictionally engaged surfaces of the assembled parts.

5. An ophthalmic mounting comprising a unitary front of non-metallic material embodying a pair of lens rims and an integral bridge member and integral perforated temple supporting lugs adjacent the temporal sides thereof, each of said lugs having upper and lower bearing surfaces in substantially parallel relation with each other, temple members having metallic hinge members comprising spaced perforated ears having bearing surfaces adapted to engage the respective upper and lower bearing surfaces of the temple lugs, one of the openings in said ears having a threaded bore, a pivot screw extending through the openings in the hinge ears and the respective temple lugs and threadedly connected with the threaded bore of one of said ears for retaining the ears in frictional engagement with the upper and lower bearing surfaces of the lugs, said lugs being formed of cellulose acetate containing a liquid plasticizer producing a self-lubricating action throughout said frictionally engaged surfaces of the assembled parts and said pivot screw adjacent the threaded end thereof being headed over to lock the parts in frictional engagement with each other.

6. An ophthalmic mounting comprising a front composed of a pair of lens rims connected by a bridge member and having temple pivotal means adjacent the temporal sides of the rims in combination with temples having temple pivotal means for connection with the temple pivotal means of the rims, one of said temple pivotal means being formed of a moldable plastic material containing a liquid plasticizer which produces a self-lubricating action and the other of said temple pivotal means being formed of metal, said temple pivotal means being pivotally connected with each other and being formed with bearing surfaces adapted to be retained in frictional relation with each other by said pivotal connection, the characteristics of said moldable plastic material containing a liquid plasticizer being such as to produce a self-lubricating action throughout the frictionally engaged surfaces.

DANIEL P. BERNHEIM.